US007783768B2

(12) United States Patent  (10) Patent No.: US 7,783,768 B2
He et al.  (45) Date of Patent: Aug. 24, 2010

(54) METHOD FOR ESTABLISHING PEER-TO-PEER CONNECTION, METHOD, APPARATUS AND SYSTEM FOR TRAVERSING NAT TO REALIZE NETWORK COMMUNICATION

(75) Inventors: Wenbin He, Shenzhen (CN); Zhibin Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 12/110,656

(22) Filed: Apr. 28, 2008

(65) Prior Publication Data
US 2008/0201480 A1 Aug. 21, 2008

Related U.S. Application Data

(63) Continuation-in-part of application No. PCT/CN2006/002869, filed on Oct. 26, 2006.

(30) Foreign Application Priority Data
Oct. 28, 2005 (CN) ........................ 2005 1 0116785
Mar. 2, 2006 (CN) ........................ 2006 1 0058629

(51) Int. Cl.
*G06F 15/16* (2006.01)
*G06F 15/173* (2006.01)
(52) U.S. Cl. ........................ 709/229; 709/225; 709/232
(58) Field of Classification Search ................. 709/212, 709/217, 219, 227, 229, 225, 232; 370/401
See application file for complete search history.

(56) References Cited
U.S. PATENT DOCUMENTS
6,661,799 B1 * 12/2003 Molitor ...................... 370/401
(Continued)

FOREIGN PATENT DOCUMENTS
TW              235570 B        7/2005
(Continued)

OTHER PUBLICATIONS
PCT Written Opinion of the International Searching Authority (Feb. 8, 2007).
(Continued)

*Primary Examiner*—Ramy M Osman
*Assistant Examiner*—Sargon N Nano
(74) *Attorney, Agent, or Firm*—Leydig, Voit & Mayer, Ltd.

(57) ABSTRACT

The employment relates to a realization method for establishing peer-to-peer communication connection, a method, an apparatus and a system for realizing network communication by traversing NAT. The employment mainly comprises following steps. When the user terminal may not directly communicate with the peer user terminal by the manner of peer-to-peer communication for needing to traverse through the NAT (network address translator) entity, the type information of the NAT entity needed to be traversed is determined. Then, the communication connection with the peer user terminal is established according to the determined type information of the NAT entity and by using the predefined manner of peer-to peer communication and the communications between the user terminals are carried out. The employment realizes that the manner of peer-to-peer communication is adopted as much as possible during the process of traversing the NAT to carry out the communication so as to reduce the occupation of server source and effectively save the costs of network operation. The employment also tries to use the corresponding re-issue mechanism during the procedure of establishing the peer-to-peer communication in order to resolve various connection establishment problems when the factors which may affect the connection establishment appear.

11 Claims, 6 Drawing Sheets

U.S. PATENT DOCUMENTS

| | | |
|---|---|---|
| 7,543,064 B2 * | 6/2009 | Juncker et al. ............... 709/227 |
| 7,558,862 B1 * | 7/2009 | Tyukasz et al. ............. 709/227 |
| 2004/0128554 A1 | 7/2004 | Maher, III et al. |
| 2004/0139228 A1 * | 7/2004 | Takeda et al. ............... 709/245 |
| 2006/0056409 A1 * | 3/2006 | Piche et al. .................. 370/389 |
| 2006/0075127 A1 * | 4/2006 | Juncker et al. .............. 709/229 |
| 2006/0215684 A1 * | 9/2006 | Capone ....................... 370/437 |
| 2007/0076729 A1 * | 4/2007 | Takeda ........................ 370/401 |
| 2007/0157303 A1 * | 7/2007 | Pankratov .................... 726/11 |
| 2008/0013524 A1 * | 1/2008 | Hwang et al. ............... 370/352 |
| 2008/0215669 A1 * | 9/2008 | Gaddy et al. ................ 709/203 |

FOREIGN PATENT DOCUMENTS

WO    WO 2004/023263 A2    3/2004

OTHER PUBLICATIONS

Takeda, "Symmetric NAT Traversal Using STUN," Memo, Internet Engineering Task Force, Internet Draft.

Wang et al., "A Prediction-Based Solution for Symmetric NAT Traversal," Computer Engineering, vol. 31, No. 11 (Jun. 2005).

* cited by examiner

METHOD FOR ESTABLISHING PEER-TO-PEER CONNECTION, METHOD, APPARATUS AND SYSTEM FOR TRAVERSING NAT TO REALIZE NETWORK COMMUNICATION

CROSS-REFERENCE TO RELATED APPLICATIONS

This application is a continuation-in-part of International Patent Application No. PCT/CN2006/002869, filed Oct. 26, 2006, which claims priority to Chinese Patent Application No. 200510116785.X, filed Oct. 28, 2005 and Chinese Patent Application No. 200610058629.7, filed Mar. 2, 2006, all of which are hereby incorporated by reference in their entirety.

FIELD OF THE INVENTION

The employment relates to the field of network communication technique and more particularly to a method for establishing Peer-To-Peer connection, a method, an apparatus and a system for traversing NAT to realize network communication.

BACKGROUND OF THE INVENTION

Currently, the P2P (peer-to-peer) communication technique in network is a kind of technique which is able to directly realize the communication between two peers without a transition server. In the process of peer-to-peer communication, the approach for the connection of two clients which are located in two different network address translation (NAT) is very crucial. Specifically, the problem of traversing NAT/FW (network address translation and firewall) in peer-to-peer communication is needed to be solved. Particularly, the traversal in the application situation of symmetric NAT, a NAT with a changing and strictly restricted port and a double intranet NAT has become an intractable problem.

NAT is produced under the situation that IP address get scarce day by day in Internet. The main object of NAT is to reuse the IP address. NAT is responsible for translating the source IP address of IP data packet, which is sent from some computers with IP address of intranet to extranets, into the IP address of public network owned by NAT. The destination IP address is not changed. NAT transfers the IP data packet to the Router, and finally to the external computers. Meanwhile, NAT is responsible for translating the destination IP address of the IP data packet returned by the external computers into the IP address of intranet. The source IP address is not changed. The IP data packet is finally sent to the intranet computers.

NAT is divided into two categories: basic NAT and Network Address/Port Translator (NAPT). The basic NAT may change the IP address of an IP packet but may not change the port in the IP packet. The NAPT not only changes the IP address of an IP data packet passing through the NAT device but also changes the TCP/UDP port of the IP data packet. The characteristic of NAPT getting on Internet determines that the computers inside the NAPT may initiate a connection to the computer outside the NAPT. It is not allowed that external hosts establish connections with the computers inside the NAPT.

In order to solve the problem of traversal, there is a technique of user datagram protocol (UDP) hole punching. The concrete technique is that, when a user requests to establish communication with a corresponding user, according to the stored information, a check server determines whether the network needed to be traversed during the communication is a symmetric NAT, a NAT with a changing and strictly restricted port or a double intranet NAT or not. If the network needed to be traversed is a symmetric NAT, a NAT with a changing and strictly restricted port or a double intranet NAT, the two user terminals communicate through the transition of the server, otherwise the two user terminals communicate in the manner of peer-to-peer.

The check server and the UDP hole punching technique will be explained respectively as follows.

The check server is configured to perform a simple traversal of UDP through NATs (STUN) technique. The STUN protocol is defined by RFC 3489. The principle of the STUN protocol is to communicate with the server group located on the public network via a STUN client, and return a customer IP and address to the client. The client judges its own position according to the feedback result obtained in many kinds of situation. The client gets to know its own position information so as to offer a foundation for realizing the corresponding traversing solution.

The UDP hole punching technique above will be explained as follows.

At first, the mapping relationship table of routing address in the intranet is described. A mapping between an intranet IP address and an extranet IP address plus port is executed when a machine located in the intranet sends data outwards every time, such as:

192.168.1.1 (LAN) - - - PORT1 (extranet);
192.168.1.2 (LAN) - - - PORT2 (extranet);

The source address of the data packet is actually translated from 192.168.1.2 to a public IP of extranet and a temporarily allocated port when data are sent outwards by 192.168.1.2. The original port2 remains unchanged if the NAT is a Cone NAT. The port will change if the NAT is a symmetric NAT. However, there exists a corresponding routing relationship between the intranet IP and the extranet port.

It can be further understood as that, when an internal host (e.g. 192.168.1.2) sends a UDP packet to an external IP (e.g. 219.237.60.1), a hole is punched on the NAT device in the intranet. The direction of the hole is 219.237.60.1. After that, the external device (219.237.60.1) may communicate with 192.168.0.10 in intranet through the hole and the other internal IP may not use this hole.

The corresponding communication course is as shown in FIG. 1 if two clients are both located under the device of Cone NAT. The specific manner is as follows.

At first, a client1 logs on the server. NAT1 allocates a port for this session, e.g. 60000. The address of the client1 received by the server is 202.187.45.3:60000. This address is the extranet address of the client1. Similarly, the client2 logs on the server. NAT2 allocates a port for this session, e.g. 40000. The address of the client2 received by the server is 187.34.1.56:40000.

At this time, the client1 and the client2 may both communicate with the server. If the client1 wants to directly send information to the client2, the client1 may obtain the public network address 187.34.1.56:40000 of the client2 from the server. At this moment, as long as a hole is punched on the NAT2 and the direction of the hole is 202.187.45.3 (i.e. the extranet address of the client1), the client2 may receive the information sent by the client1 to 187.34.1.56:40000.

The operation of punching hole needs the server to instruct the client2 to send because the server keeps communicating with the client2. That is to say, the client1 sends an instruction to the server and request the server to instruct the client2 to punch a hole orienting towards the client1 if the client1 wants to send information to the client2.

However, the above course is adapted to the situation of Cone NAT. If the NAT is a symmetric NAT, the client2 may not get to know the corresponding port information and may not punch the hole because the port where the client2 punches the hole to the client1 has been renewedly allocated.

From the above introduction, it can be seen that there exists solutions to realize NAT traversal processing for the following situations:

1. At least one of the sending part and the receiving part is located in the public network.

2. The sending part and the receiving part are both located in the Cone NAT, including Full Cone, IP Restricted Cone and Port Restricted Cone.

However, with regard to the situations listed in Table.1, the solution used currently is transition communication via the server and may not truly realize P2P communication.

TABLE 1

| Order number | The type of the sending part (client1) NAT | The type of the receiving part (client2) NAT |
| --- | --- | --- |
| 1 | Symmetric NAT | Symmetric NAT |
| 2 | Port Restricted Cone | Symmetric NAT |
| 3 | Symmetric NAT | Port Restricted Cone |

In other word, it can be seen that traversing a basic NAT may be realized through the above technique. However, this kind of technique may not traverse the symmetric NAT and the NAT with a strictly restricted port (Port Restricted Cone).

Therefore, UDP hole punching is a simple traversal to the intranet. This technique is very limited. It's usually needed to be realized via a transition server during processing the network with a restricted port and a symmetric NAT. A peer-to-peer traversal may not be realized. The situation of transition communication service by occupying a large amount of resource of transition server may increase the cost of network operation inevitably.

SUMMARY OF THE INVENTION

The employment provides a method for establishing peer-to-peer connection, a method, an apparatus and a system for realizing network communication traversing NAT, which make the peer-to-peer communication connection be adopted as much as possible during the network traversing the NAT. The costs of network operation are decreased.

The employment is realized by the following technological solution:

The employment provides a method for establishing peer-to-peer communication connection, for establishing a peer-to-peer connection between a local user terminal and a peer user terminal by attempting, which includes the following:

One port or ports possibly changed to are predicted at the next time according to a port changing regularity of symmetric network address translation (NAT) of the peer user terminal; and the peer-to-peer communication connection with the peer user terminal is attempted to be established via the predicted port or ports until the corresponding peer-to-peer communication connection is established.

The method further includes a processing for determining the changing regularity, which includes the following:

On the server side, the peer user terminal under the symmetric NAT is ordered to continuously send data to ports maintained by a server or to a check server;

The server predicts a corresponding port information according to the received data; and The server determines the changing regularity of the symmetric NAT according to the port information.

Alternatively, the changing regularity includes:

A regular changing regularity which may accurately predict the next possible changing port;

A comparatively regular changing regularity which may predict a scope information of the next possible changing port; and An irregular changing regularity which may not predict the information of the next possible changing port;

The processing of attempting to establish the peer-to-peer communication connection specifically includes:

Whether the changing regularity of the port of the symmetric NAT where the peer user terminal is located is the irregular changing regularity or not is judged; if the changing regularity is the irregular changing regularity, the port of the symmetric NAT for sending data to the server is updated and a processing to order the peer user terminal located under the symmetric NAT is triggered to continuously send the data;

otherwise, whether the changing regularity is the comparatively regular changing regularity or not is further judged; if the changing regularity is the comparatively regular changing regularity, a preset value for the current port value as a scope for predicting the port is added and the peer-to-peer communication connection is attempted to be established; otherwise, the port is determined to be regular changing and the peer-to-peer communication connection is attempted to accurately be established according to the predicted the next changing port.

Alternatively, when the changing regularity of the port is the irregular changing regularity, the method further includes:

Whether the times of the port updating have reached a preset value or not is judged; if the times have reached the preset value, the communication between the two user terminals by the manner of server transition is established; otherwise, the port of the symmetric NAT for sending the data to the server is updated and the processing to order the peer user terminal located under the symmetric NAT to continuously send the data is triggered.

Alternatively, the processing of adding the preset value to the current port value as the scope for predicting the port and attempting to establish the peer-to-peer communication connection specifically includes any one of the following manners:

The peer user terminal executes a circular hole punching from N to N+U until the connection between the two user terminals is established; N is a current port number and U is a preset value;

or, the peer user terminal executes a hole punching for n round. The peer user terminal executes a circular hole punching from N to N+U×m in the mth round until the connection between the two user terminals is established; n is an integer greater than one;

or, the peer user terminal executes a hole punching for n round. The peer user terminal executes a circular hole punching from N to N+U in the first round; the peer user terminal executes circular hole punching from N+U×(m−2) to N+U×m in the mth round until the connection between the two user terminals is established;

or, the peer user terminal executes a hole punching for n round. The peer user terminal executes a circular hole punching from N+U×(m−1) to N+U×m in the mth round until the connection between the two user terminals is established.

The employment provides a method for traversing network address translation (NAT) to realize network communication, including the following:

A user terminal determines a type information of an NAT entity needing to be traversed when the user terminal may not directly initiate a communication with the peer user terminal by peer-to-peer communication manner because there exists the NAT entity needing to be traversed;

the user terminal, according to the determined type information of the NAT entity, establishes the communication connection with the peer user terminal by using a passive peer-to-peer communication manner predefined by which the peer user terminal initiates the peer-to-peer communication procedure, and corresponding to the type information of the NAT entity or by using the peer-to-peer communication manner by which the user terminal initiates the communication to establish the peer-to-peer communication connection by attempting according to a port changing regularity, and performing the communication between the user terminals.

Alternatively, the processing of attempting the connection includes the following:

The information of the port used by the symmetric NAT where the peer user terminal is located is adjusted and a processing for ordering the peer user terminal located under the symmetric NAT to send data continuously is triggered when the connection is not successful by a preset connection attempting times.

The employment further provides an apparatus for establishing peer-to-peer communication connection, adapted to establish a peer-to-peer communication connection between a local user terminal and a peer user terminal, being an apparatus for establishing the peer-to-peer communication connection by an attempting manner, which includes the following:

A port changing regularity predicting unit is adapted to predict a port or ports possibly being changed to at next time according to a port changing regularity of a symmetric NAT of the peer user terminal; and a processing unit attempting to establish connection is adapted to attempt to establish the peer-to-peer communication connection with the peer user terminal via a predicted port or ports until the corresponding peer-to-peer communication connection is established.

Alternatively, corresponding to the above three changing regularities, the processing unit attempting to establish connection includes:

A processing unit attempting to establish connection with the regular changing is adapted to attempt to accurately establish peer-to-peer communication connection according to the predicted next changing port after determining that the port is regular changing;

a processing unit attempting to establish connection with the comparatively regular changing is adapted to attempt to establish peer-to-peer communication connection by adding a preset value to the current port value as a predicting scope of the port every time;

a processing unit attempting to establish connection with the irregular changing is adapted to update the port for sending data by the symmetric NAT to the server, trigger the processing of ordering the peer user terminal located in the symmetric NAT to continuously send data, and attempt to establish the peer-to-peer communication connection.

Alternatively, the processing unit attempting to establish connection with the irregular changing further communicates with a first judging and processing unit; the first judging and processing unit is adapted to judge whether the times of port update have achieved a preset value or not; the communication between the two user terminals is established by a manner of server transition if the times of the port update have achieved the preset value; the processing unit attempting to establish connection with the irregular changing continues to execute the corresponding processing if the times of the port update have not achieved the preset value.

Alternatively, the port changing regularity predicting unit is adapted to order the peer user terminal located under the symmetric NAT to continuously send data to ports maintained by a server or a check server on a server side; the server predicts the corresponding port information according to the received data and determines the changing regularity of the symmetric NAT according to the port information.

The employment further provides a system for traversing network address translation (NAT) to realize network communication, including the following:

A NAT entity type determining unit is adapted to determine the type information of an NAT entity needing to be traversed when the user terminal may not directly initiates the communication with the peer user terminal by a peer-to-peer communication manner because there exists an NAT entity needing to be traversed;

a communication processing unit is adapted to, according to the type information of the NAT entity determined by the NAT entity type determining unit, establish a communication connection with the peer user terminal and perform communication between the user terminals by triggering to use the passive peer-to-peer communication manner predefined by which the peer user terminal initiates to establish the peer-to-peer communication procedure corresponding to the type information of the NAT entity; or by triggering to use the realization apparatus for establishing peer-to-peer communication connection according to any of claim 9 to claim 12.

Alternatively, the communication processing unit includes the following:

A first type communication processing unit is adapted to establish the peer-to-peer connection between the user terminals by triggering to use a passive peer-to-peer communication manner by which the peer user terminal initiates to establish the peer-to-peer communication procedure when the type of the NAT entity is the first type, and perform the communication between the user terminals; and, a second type communication processing unit is adapted to establish a communication connection with the peer user terminal by triggering to use the apparatus for establishing peer-to-peer communication connection when the type of the NAT entity is the second type, and perform the communication between the user terminals.

Alternatively, the type of the NAT entity in above solutions includes the following:

A first type includes that the local user terminal is located in public network and the peer user terminal is located under the NAT; or the local user terminal is located in a symmetric NAT and the peer user terminal is located under a completely Cone NAT or a Cone NAT with restricted IP; or the local user terminal is located under the completely Cone NAT or the Cone NAT with restricted IP and the peer user terminal is located in the symmetric NAT;

or, a second type includes that the local user terminal is located under the symmetric NAT and the peer user terminal is located under the symmetric NAT or the Cone NAT with restricted port; or the local user terminal is located under the Cone NAT with restricted port and the peer user terminal is located under the symmetric NAT.

It can be seen from the technological solutions provided by the employment that the realization of the employment makes the peer-to-peer communication manner be adopted as much as possible in the progress of performing communication by traversing NAT. The occupation of the server resource is reduced and the cost of network operation is saved effectively. The employment uses the corresponding retransmission mechanism in the progress of attempting to establish peer-to-peer communication connection so as to solve the problem of connection establishment when various possible factors which may affect the connection establishment appear. The various possible factors which may affect the connection establishment may be, but not limited to, that the user launches plurality of applications for real-time communication, the next changing port of the symmetric NAT is occupied, and the network is busy or UDP (User Datagram Protocol) packet loss.

DETAILED DESCRIPTION OF THE PREFERRED EMBODIMENTS

One embodiment of the employment uses the manner of combining the UDP hole punching technique, the server tracker technique and the UDP port number prediction technique together to solve the problems existing in the process of traversal. That is to say, in this embodiment, a manner of server coordination and server port presuming is adopted for the port restricted network and the symmetric NAT. In other words, a manner of P2P traversing is adopted for communication as much as possible at first, once the traversal of NAT/FW meets the strictly restricted port network or the symmetric NAT. A manner of the transition server is adopted for communication if it's confirmed that the connection may not be established successfully after attempting to traversal.

Therefore, the embodiment of employment may effectively improve the efficiency of P2P connection in the practical application.

In one embodiment of the employment, PC (host) client may detect the NAT type of its own access network after each start-up to determine whether the access network is located in the NAT with strictly restricted port or the NAT with the port changing. By the detection, the network side may obtain the information and adopt the corresponding communication processing manner to realize the communication between the clients according to the information.

In the above embodiment, the management to the information of clients via a server may be needed. Specifically, after the clients are registered, the registered IP and ports of the clients may be maintained in order to effectively identify the type of the network where the users/clients are located. And the corresponding communication processing manner may be chosen conveniently. The management includes error detection and correction management. Specifically, the registered port is not very formal because of the network instability or many other uncertainties, especially the situation of a campus multi-level NAT located in the symmetric NAT of this port changing or the network of the enterprise. The registered port sometimes may be negative number, e.g. (−12345) and sometimes may be (123&45). In the above situations, these abnormal ports may not be casually abandoned; instead, necessary modification needs to be made to these abnormal ports. For example, (−12345) is modified into (12345), (123&45) is modified into 12345 by deleting "&".

Figure 1:
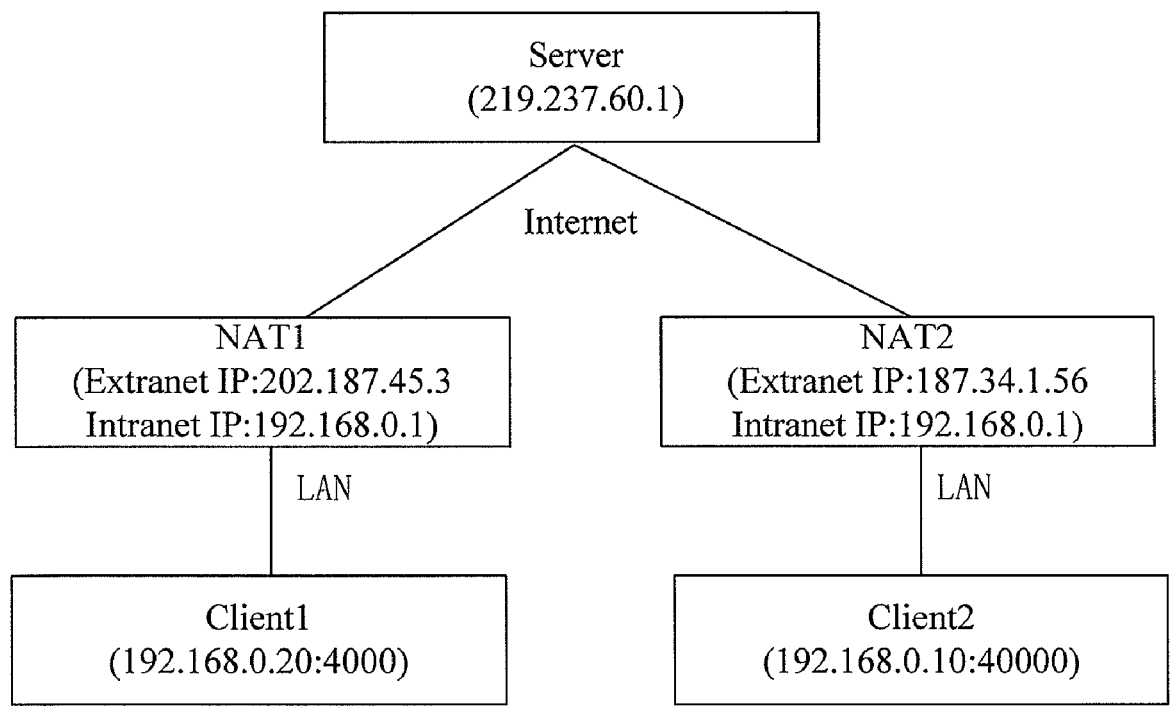
FIG. 1 is a schematic diagram illustrating the system structure for communicating by traversing NAT.
Figure 2:
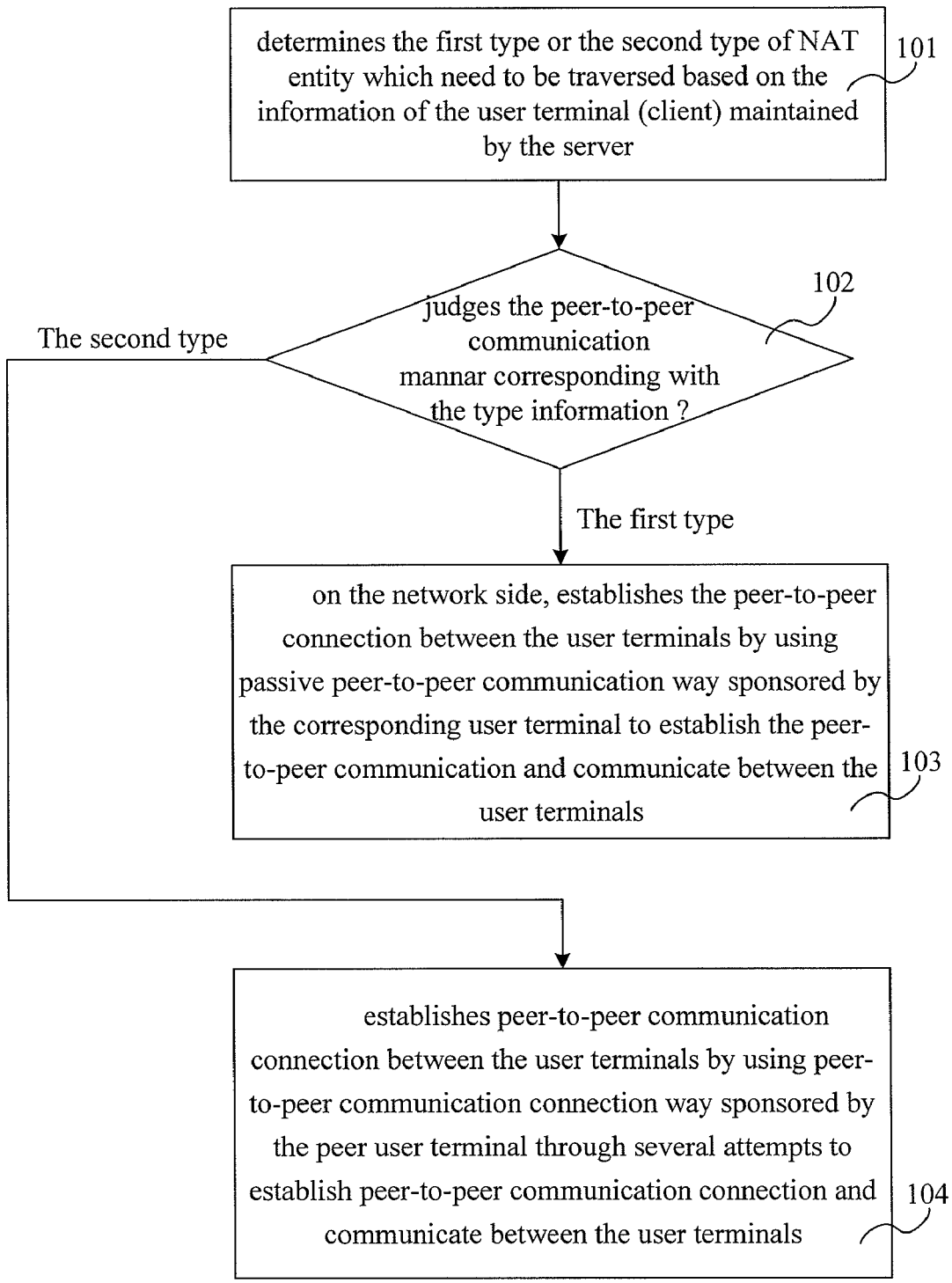
FIG. 2 is a flowchart for specifically realizing the method of some embodiments.

FIG. 2 is a flowchart for the method of an embodiment. The method for traversing NAT to realize network communication is used to process the situation that the user terminal may not initiate a peer-to-peer communication with the peer user terminal directly. As shown in the FIG. 2, the method includes following steps:

Step 101: The type of NAT entity which needs to be traversed is determined according to the information of the user terminal (i.e. client) maintained on a server.

The type of the NAT entity includes a first type and a second type.

The first type is the situation of establishing the peer-to-peer connection between the user terminals by a manner that the peer user terminal (the called user terminal) initiates a peer-to-peer communication procedure. The manner may be called a passive peer-to-peer communication manner. The first type specifically includes the situation that the local user terminal is located in public network while the peer user terminal in the NAT; or the situation that the local user terminal is located in a symmetric NAT while the peer user terminal in a completely Cone NAT or a Cone NAT with restricted IP; or the situation that the local user terminal is located in the completely Cone NAT or the Cone NAT with restricted IP while the peer user terminal in the symmetric NAT;

The second type is the situation of establishing the peer-to-peer communication connection between the user terminals by the manner that the user terminal initiating the communication establishes a peer-to-peer communication procedure through several attempts. The second type specifically includes the situation that the local user terminal is located under the symmetric NAT while the peer user terminal under the symmetric NAT or the Cone NAT with restricted port; or the situation that the local user terminal is located under the Cone NAT with restricted port while the peer user terminal under the symmetric NAT.

Step 102: The peer-to-peer communication manner is determined according to the type of the NAT entity. The peer-to-peer communication manner corresponding to the type information of the NAT entity is predefined as in the above Step11. Step 103 is executed if the NAT entity is the first type. Step 104 is executed if the NAT entity is the second type.

Step 103: When the type of the NAT is the first type, on the network side, the peer-to-peer connection between the user terminals is established by using the passive peer-to-peer communication manner that the peer user terminal initiates to establish the peer-to-peer communication procedure. The communication between the user terminals is performed.

Step 104: When the NAT entity is the second type, the peer-to-peer connection between the user terminals is established by using the manner that the user terminal initiating the communication establishes the peer-to-peer communication connection between the user terminals through several attempts. The communication between the user terminals is performed.

The embodiment provides two different manners for realizing the peer-to-peer communication respectively for different types of the NAT. Besides, for the situation of establishing the peer-to-peer communication connection based on the UDP hole punching technique, the embodiment uses the existing manner for establishing the peer-to-peer communication connection (called the first of USU strategies) to communicate. The two different kinds of peer-to-peer communication manners provided by the embodiment is as follows.

At first, the first peer-to-peer communication manner is described.

In the first peer-to-peer communication manner (called the second of USU strategies), the server may obtain network status information of the clients, e.g. being the extranet or intranet or the status of the NAT, by the way that all the clients log on the register server in advance. The server may perform coordination processing of the peer-to-peer communication according to the obtained network status information. In order to establish the peer-to-peer communication connection between two clients, the client which is more easily to be connected to than the other client is used as the destination part for the connection. The other client is used as the calling initiator.

For example, the client1 initiatively connects the client2. The server perform coordination to make client2 to initiatively connect the client1 when the server finds that the client1 is easy to be connected to but the client2 is not easy to be connected to. However, in the realistic scene, to the client1, the connection with the client2 is still initiated by itself. In fact, the client1 is not the initiative connection part but the connected client. Therefore, the problem that the communication connection may not be established by using the existing peer-to-peer communication manner under the corresponding application scene may be solved. And the peer-to-peer communication manner may be adopted as much as possible in the communication procedure to reduce the occupation of the resource of the server.

Secondly, the second peer-to-peer communication manner (i.e. attempting to establish peer-to-peer communication) is described in detail.

The realization of the second manner (called the third of USU strategies) is to solve the problem of the symmetric NAT and the NAT with strictly restricted port. Besides, the above first manner of peer-to-peer communication obviously may not be adopted when the client1 has detected that the client2 is in the symmetric NAT and the client1 itself is also in the symmetric NAT or the NAT with strictly restricted port.

In this second manner, the server requests the client2 to send data continually to a group of ports of local machine maintained by the server itself or to a group of check servers of different extranet hosts when the client1 applies to the server once again. After that, the server analyzes the type of the port changing of the client2 according to the received port information. The type of the port changing includes three situations: regular changing, comparatively regular changing and irregular changing.

The server performs analysis by calling its own analysis function respectively aiming at the above three situations.

1. The Situation of Regular Changing

The changing value may be N+1, N+2, N+N . . . if the client2 is located in the symmetric NAT of regular changing. The server may obtain the next changing value of the opposite part of P2P easily. Then the server sends the predicted value to the client2 and requests the client2 to punch a hole on the client2's own NAT according to the next possible port to establish a tunnel in advance. The server also sends a message to the client1 and requests the client1 to send a data packet to the port presumed by the server and where the client2 has punched the hole in advance. The connection is established.

For example, the NAT1 (202.187.45.3) allocates a UDP port 62000 for the client1 and the NAT2 (187.34.1.56) allocates a UDP port 31000 for the client2. The client1 and client2 both get to know the public IP and port mapped with each other by the conversation with the server. The client1 sends a UDP message to 187.34.1.56:31001 (the port number is increased) and the client2 sends a UDP message to 202.187.45.3:62001 at the same time. A dual-direction session channel located between the client1 and the client2 is established if the NAT1 and the NAT2 continue to allocate ports for a new session and the session time from A to S and B to S is not consumed too much.

2. The Situation of Comparatively Regular Changing

The server performs analysis by using the linear approaching strategy in the symmetric NAT of comparatively regular changing.

Normally, the symmetric NAT adds N directly based on the original port number (N). However, there are also many cases that the added N is not fixed. Under this situation, the prediction by the server is more important. In order to improve the accuracy of the prediction, the sever may update the port changing list of clients before predicting. The corresponding method is that the server prepares some monitor port numbers and notifies the clients locating in the symmetric NAT to send message packets to these monitor ports. When these message packets pass the NAT, the ports of source address are all changed. And the server may get to know the port change information after receiving these message packets.

For example, the port of the opposite part of P2P for connection is 3245 at the beginning. The trend is:

3245, 3256, 6788, 9876, 9978;

3245, 1234, 1232, 1100, 1000;

The next port number is presumed by a testing manner of cycle reissue mechanism. In some examples, the simplest testing manner is sending UDP from 9978 to 65535. This manner basically can guarantee the connection successful, but the expense is too big. In this example, there are 65535-9978=55557 data packets to be sent. In other examples, the testing manner is sending UDP from 9978 to 30000, because the ports after 30000 are seldom opened, by the analysis based on seizing packets. However, the expense is still too big.

In some other examples, the increase trend (change) each time may be analyzed. For example, the change may not exceed a fixed value which is known from the difference value by subtracting the former time from the later time. Specifically, for the ports number 3245, 3256, 6788, 9876 and 9978, the change doesn't exceed a fixed value 500, and then the testing manner is to send UDP from 9978 to 9978+500. There are 500 packets totally used for testing. So the increase trend is further optimized to 500 each time to test by sending 9978 to 9978+500, 9978 to 9978+1000, 9978 to 9978+1500, 9978 to 9978+2000, 9978 to 9978+2500 . . . . That is to say, at the first time, there are 500 packets totally used for testing. If the test failure, 500 packets is increased, there are 1000 packets totally used for next testing. With this operation, the test is continued until the test is successful. The expense is not big because the manner is UDP. A stable connection may be determined by hitting the port of the opposite part for one time. The strategy may be called linear approaching for the third of USU strategies.

It should be noted that most situations of unsuccessful connection are packet loss because of instability in the net work. Therefore, with this operation, the test is continued until the test is successful.

for (i=9978 . . . i=9978+500);
for (i=9978 . . . i=9978+1000);
for (i=9978+500 . . . i=9978+1500);
. . . .

In other words, in the first round, the client2 executes the circular hole punching from N to N+U, in the mth round bigger than one, the client2 executes the circular hole punching from N+U×(m−2) to N+U×m. N is the last port of hole punching when the changing regularity is analyzed. U is a value greater than the difference between any ports of fore-and-after adjacent hole punching in the port changing list. In the above example, N=9978 and U=500.

In this manner, assurance of retrying for every port one time at least, may avoid packet loss and reduce cost.

If the network is stable and packet loss is not considered, the following manner may be adopted:

for (i=9978 . . . i=9978+500);
for (i=9978+500 . . . i=9978+1000);
for (i=9978+1000 . . . i=9978+1500);
. . . .

In other words, in the mth round, the client2 executes the circular hole punching from N+U×(m−1) to N+U×m. N is the last port of hole punching when the changing regularity is analyzed. U is a value greater than the difference between any ports of fore-and-after adjacent hole punching in the port changing list. In the above example, N=9978 and U=500.

3. The Situation of Irregular Changing

Transition communication is performed by using a transition server in the symmetric NAT of irregular changing and the connection may not be established successfully by attempting for several times.

In addition, in the practical processing, different reissue mechanism may be used to improve the efficiency of establishing a connection when a peer-to-peer communication connection is not established by attempting for one time. In the procedure of establishing peer-to-peer connection, the disadvantageous impact brought by various possible factors which may impact the connection establishment may be effectively overcome by the reissue mechanism.

Figure 3:
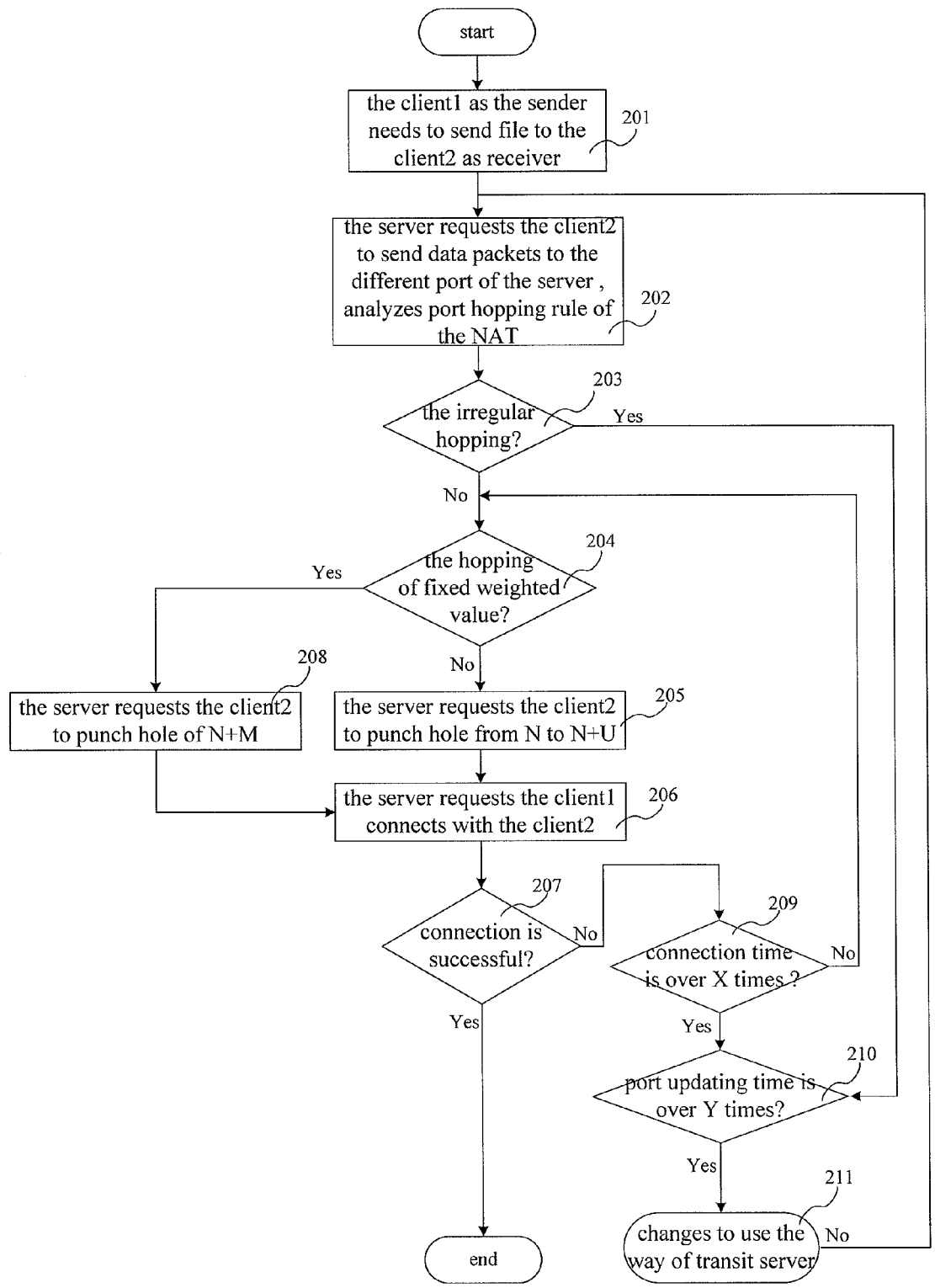
FIG. 3 is a schematic diagram illustrating the progress for performing peer-to peer connection by using a port attempting manner of an embodiment.

When the second manner of establishing peer-to-peer communication connection (a manner by attempting to establish the peer-to-peer communication connection) is adopted, i.e. the third of USU strategies, a processing flow of the symmetric NAT changing shown in the FIG. 3 specifically includes following steps:

Step 201: The client1 proposes a connection application to the server, when the client1 as the sending part needs to send a file to the client2 as the receiving part, i.e. establishes the connection between two parts;

Step 202: The server requests the client2 to send data packets to different ports of the server in order to analyze the port changing regularity of the NAT where the client2 is located according to the received data packets;

Step 203: The port changing is judged whether it is the irregular changing or not. If the port changing is the irregular changing, step 210 is executed, otherwise, step 204 is executed;

Step 204: The port changing is judged whether it is the comparatively regular changing or not, i.e. the changing with fixed weighting value (or the range of the port change is relatively fixed). If the port changing is the comparatively regular changing, step 208 is executed; otherwise step 205 is executed;

Step 205: If the port changing of the NAT where the client2 is located is determined to be a regular changing, the server requests the client2 to perform "for (I=N, N+U)" hole punching in order to establish the peer-to-peer communication connection between the two clients. Here, N is the current port number, U is the step length value of the regular changing and N+U is the accurate value after the port changing;

Step 206: The server requests the client1 to connect the client2 after successfully punching the hole and step 207 is executed;

Step 207: The peer-to-peer communication connection is judged whether it is successful or not. If the peer-to-peer communication connection is successful, the procedure of establishing the connection ends, otherwise step 209 is executed;

Step 208: The server requests the client2 to perform N+M hole punching in order to establish peer-to-peer communication connection between the two clients. Here, N is the current port number, N+M is the port value which is not be exceeded by the fixed port changing and step 206 is executed;

Step 209: The connection is attempted again. The attempting times are judged whether they achieve the preset the X times. If they achieve the X times, step 210 is executed, otherwise step 204 is executed;

Step 210: The port updating times are judged whether they have achieved the preset Y times. If they have achieved Y times, step 211 is executed, otherwise the port used by the symmetric NAT where the client2 is located continues to be updated and step 202 is executed;

Step 211: The communication between the two parts is established by the manner of server transition.

In the practical applications of some embodiments, the server determines which manner described above is adopted to realize the peer-to-peer communication between the clients, according to the status information of the network where the maintained sending part and receiving part are located. The possible situations are:

At first, at least one part of the initiating part and the called part of the communication is located in the public network. The following specific situations are included.

1. If the two clients are both located in the public network, the two clients may be directly connected.

2. If one of the two clients is located in the private network, the client located in the private network initiatively connects the client located in the public network.

The specific processing manner is shown in Table 2:

TABLE 2

| Serial number | NAT type of the sending part (clien1) | NAT type of the receiving part (clien2) | Server strategies |
|---|---|---|---|
| 1 | public network | public network | Noticing the client1 to directly connect the client2 |
| 2 | public network | UDP blocked | (The second of USU strategies) Noticing the client2 to reversely connect the client2 by using the manner of TCP |
| 3 | public network | Various NAT | (The second of USU strategies) Noticing the client2 to reversely connect the client1 by using the manner of UDP |
| 4 | UDP blocked | public network | Noticing the client1 to connect the client2 by using the manner of TCP |
| 5 | Various NAT | public network | Noticing the client1 to connect the client2 by using the manner of UDP |

Secondly, if the two clients are both located in the private network, the following specific situations are included:

1. One of the two clients is located in the UDP blocked network (UDP restriction); the communication between the two clients may be realized by using the manner of server transition;

2. The two clients are both located in the NAT network, the corresponding processing manner is shown in Table 3.

TABLE 3

| Serial number | NAT type of the sending part (clien1) | NAT type of the receiving part (clien2) | Server strategies |
|---|---|---|---|
| 1 | Cone NAT (Full Cone, IP Restricted Cone, Port Restricted Cone) | Cone NAT (Full Cone, Restricted Cone, Port Restricted Cone) | (The first of USU strategies) 1) noticing the client2 to send message to the IP and port of the client1 2) noticing the client1 to connect the client2 |
| 2 | Full Cone, Restricted Cone | Symmetric NAT | (The second of USU strategies) 1) noticing the client1 to send message to the IP and port of the client2 2) noticing the client2 to reversely connect the client1 |
| 3 | Symmetric NAT | Full Cone, Restricted Cone | (The second of USU strategies) 1) noticing the client1 to send message to the IP and port of the client2 2) noticing the client2 to reversely connect the client1 |
| 4 | Symmetric NAT | Symmetric NAT | The third of USU strategies |
| 5 | Port Restricted Cone | Symmetric NAT | The third of USU strategies |
| 6 | Symmetric NAT | Port Restricted Cone | The third of USU strategies |

In order to facilitate a better understanding of the employment, two specific embodiments of the manners about establishing peer-to-peer communication connection by attempting is described in detail with the drawings.

Figure 4:
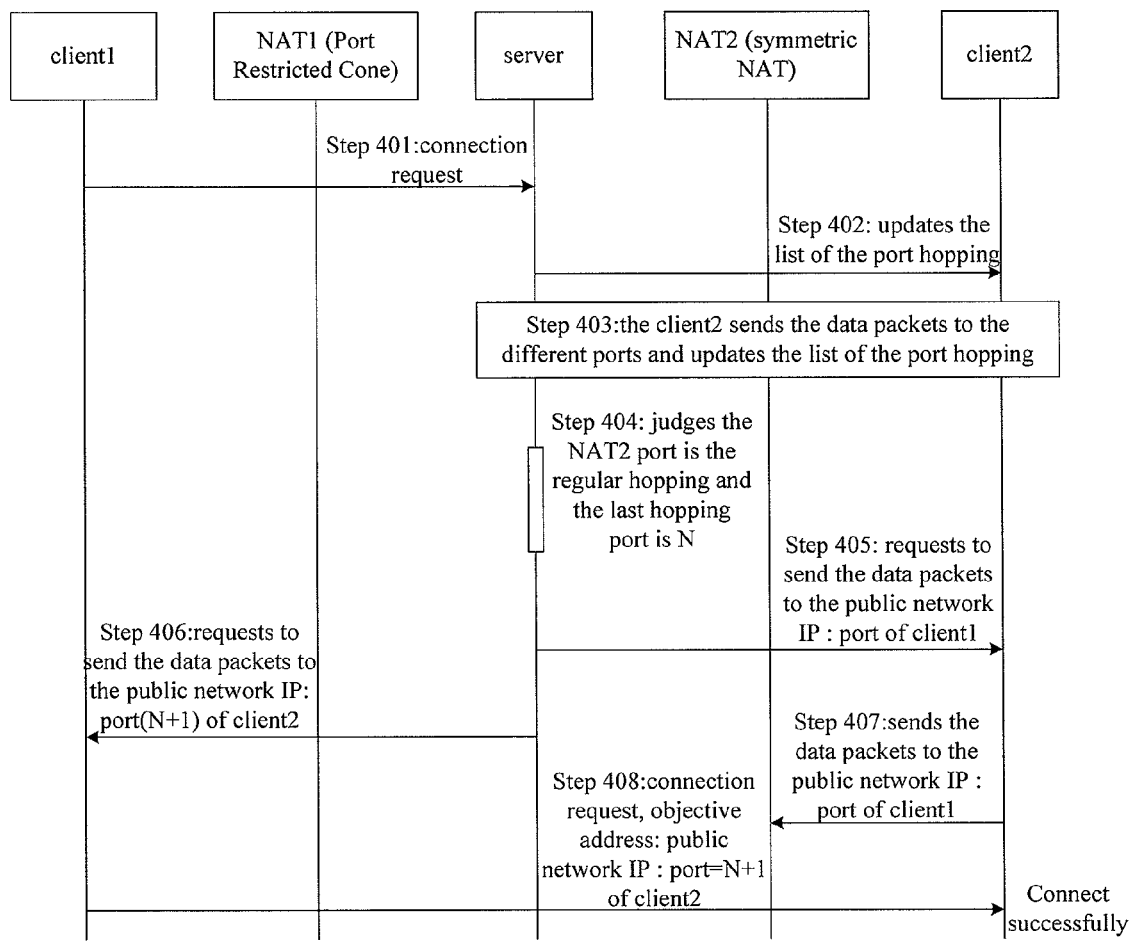
FIG. 4 is a flowchart for realizing the connection method with the port changing being the regular changing and fixed weighting value of some embodiments.

(1) The FIG. 4 is a flowchart for realizing the connection method of some embodiments. The first, for the situation of the symmetric NAT of the regular changing port with fixed weighing value, i.e. under the situation of regular port changing, the corresponding communication method is executed and includes the following steps:

The client1 sends a request to the server for connecting the client2;

The server sends a request for updating the port changing list to the client2 after receiving the request;

The client2 sends data packets to different ports of the server to update the port changing list stored on the server after receiving the request for updating the port changing list;

The server determines that the port changing is the regular changing and the weighing value is fixed to be M, i.e. the NAT2 port is the regular changing according to the port changing list. The last changing port is N when the changing regularity is updated; and The server requests the client2 to perform N+M hole punching to establish the connection between the client1 and the client2, i.e. the server requests the client2 to send data packets to the public network IP: port (the port is the port allocated by the NAT1 for the client1) of the client1. Meanwhile, the client1 is requested to send data packets to the public network IP: port (N+M) of the client2.

Specifically, the above method includes the following steps:

Step 401: The client1 sends a collection request to the server for connecting the client2;

Step 402: The server updates the port changing list and sends a request to the client2 after receiving the request;

Step 403: The client2 sends data packets to the different ports of the server and updates the port changing list;

Step 404: The server judges the NAT2 port is the regular hopping and the last hopping port is N;

Step 405: The server requests to send the data packets to the public network IP: port of client1;

Step 406: The server requests to send the data packets to the public network IP: port (N+1) of client2;

Step 407: The client2 sends the data packets to the public network IP: port of client1;

Step 408: The client1 sends connection request and the objective address is public network IP: port=N+1 of client2.

Hypothetically, the NAT1 (202.187.45.3) allocates a UDP port 62000 for the client1. The NAT2 (187.34.1.56) allocates a UDP port 31000 for the client2. The client1 and the client2 both get to know the public network IP and port mapped with the other part by the conversation with the server.

Based on the above hypothesis, the client1 sends a request to the server when the client1 requests to connect the client2. The server requests the client2 to send data packets to different ports of the server and update the port changing list. Hypothetically, the port changing list after being updated becomes: 31001, 31002, 31003, 31004. It can be seen from the port changing list that the changing regularity is the regular changing with the fixed weighing value 1. Then, the server requests the client2 to send data packets to the public network 202.187.45.3:62000 of the client1 in order to establish session corresponding relation on the NAT2. The server requests the client1 to send data packets to the public network 187.34.1.56:31005 (31004+1 (weighting value)) of the client2 in order to establish the connection between the client1 and the client2d.

Figure 5:
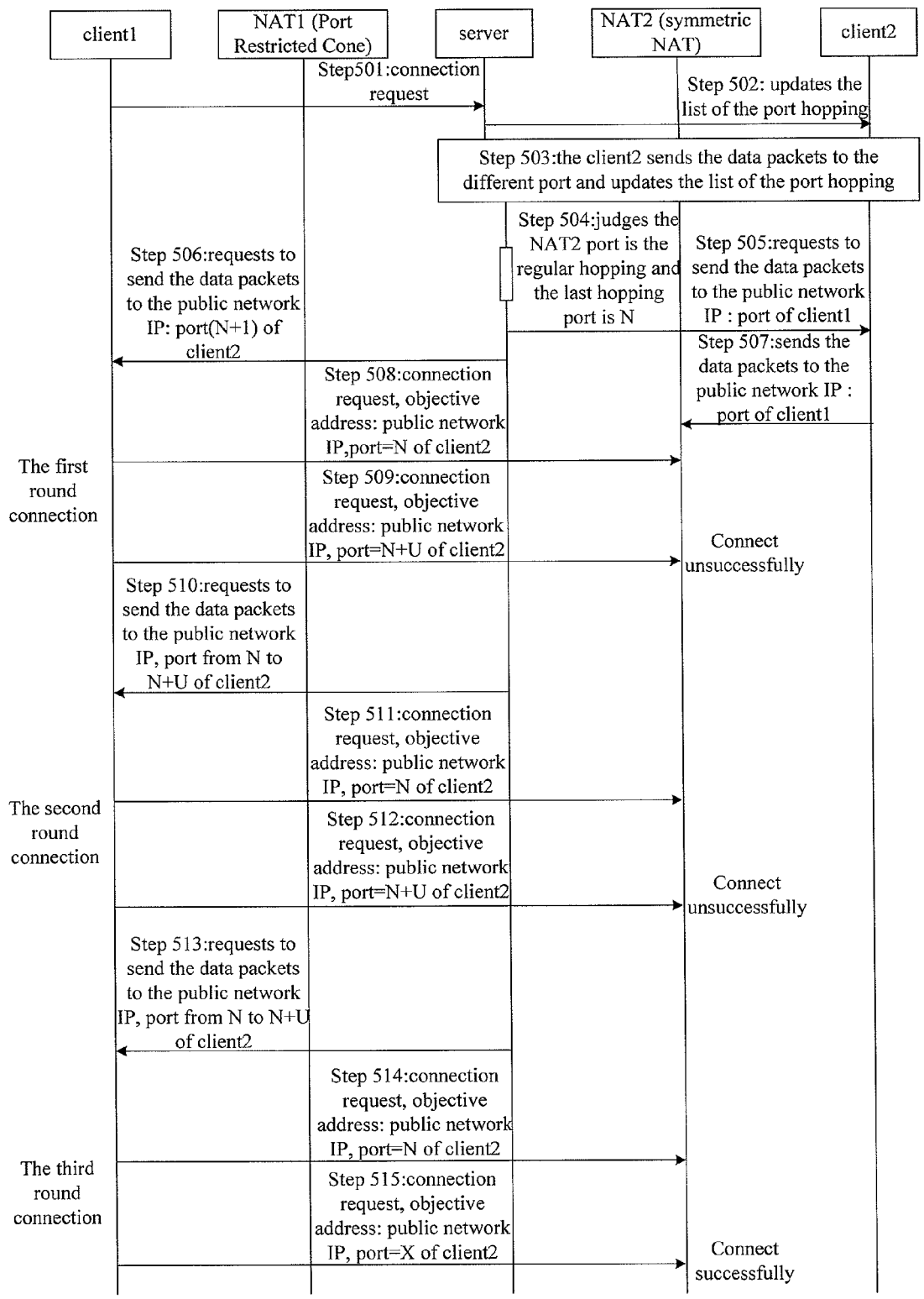
FIG. 5 is a flowchart for realizing the connection method with the port changing being the regular changing but unfixed weighting value of some embodiments.

(2) FIG. 5 is a flowchart for realizing the connection method of some other embodiments. These embodiments are under the situation that the weighing value is not fixed, i.e. the port changing is comparatively regular. The port changing regularity of symmetric NAT often is that, on the basis of the original port (N), M is added directly every time. However, the M is not fixed in many situations.

At first, the client1 sends a request to the server for connecting the client2;

The server sends a request for updating the port changing list to the client2 after receiving the request;

The client2 sends data packets to different ports to update the port changing list stored on the server after receiving the request for updating the port changing list;

The server determines that the port changing is the regular changing according to the port changing list and the weighing value may be fixed or unfixed. However the difference between any ports of fore-and-aft adjacent hole punching is not more than U; and The server requests the client2 to perform N N, N+1, ..., N+U (N is the last port when the changing regularity is updated) hole punching and establish the connection between the client1 and the client2. Specifically, the server requests the client2 to send data packets to the public network IP: port (the port is the port allocated by the NAT1 for the client1) of the client1. Meanwhile, the client1 is requested to send data packets to the public network IP: port (the port is N, N+1 ... N+M) of the client2. The second round is executed when the first round connection is unsuccessful. The server requests the client2 to perform N, N+1 ... N+U×2 hole punching. If the second round connection is unsuccessful either, the third round is executed according to the regularity. Analogically, unnecessary details won't be described here any longer.

Specifically, the above method includes the following steps:

Step 501: The client1 sends a collection request to the server for connecting the client2;

Step 502: The server updates the port changing list and sends a request to the client2 after receiving the request;

Step 503: The client2 sends data packets to the different ports of the server and updates the port changing list;

Step 504: The server judges the NAT2 port is the regular hopping and the last hopping port is N;

Step 505: The server requests to send the data packets to the public network IP: port of client1;

Step 506: The server requests to send the data packets to the public network IP: port (N+1) of client2;

Step 507: The client2 sends the data packets to the public network IP: port of client1;

Step 508: The client1 sends the connection request and the objective address is public network IP: port=N+1 of client2.

the first round connection includes:

Step 509: The client1 sends the connection request and the objective address is public network IP, port=N+U of client2; if the connection is not successful, execute the Step 510;

Step 510: The server requests to send the data packets to the public network IP, port from N to N+U of client2

Step 511: The client1 sends the connection request and the objective address: public network IP, port=N of client2;

the second round connection includes:

Step 512: The client1 sends the connection request and the objective address is public network IP, port=N+U of client2; if the connection is not successful, execute the Step 513;

Step 513: The server requests to send the data packets to the public network IP, port from N to N+U of client2;

Step 514: The client1 sends the connection request and the objective address: public network IP, port=N of client2;

the third round connection includes:

Step 515: The client1 sends the connection request and the objective address is public network IP, port=X of client2, the connection is successful in the third round connection.

In the embodiments shown in the FIG. 5, the port of the client2 is X when the connection is established in the third round.

Figure 6:
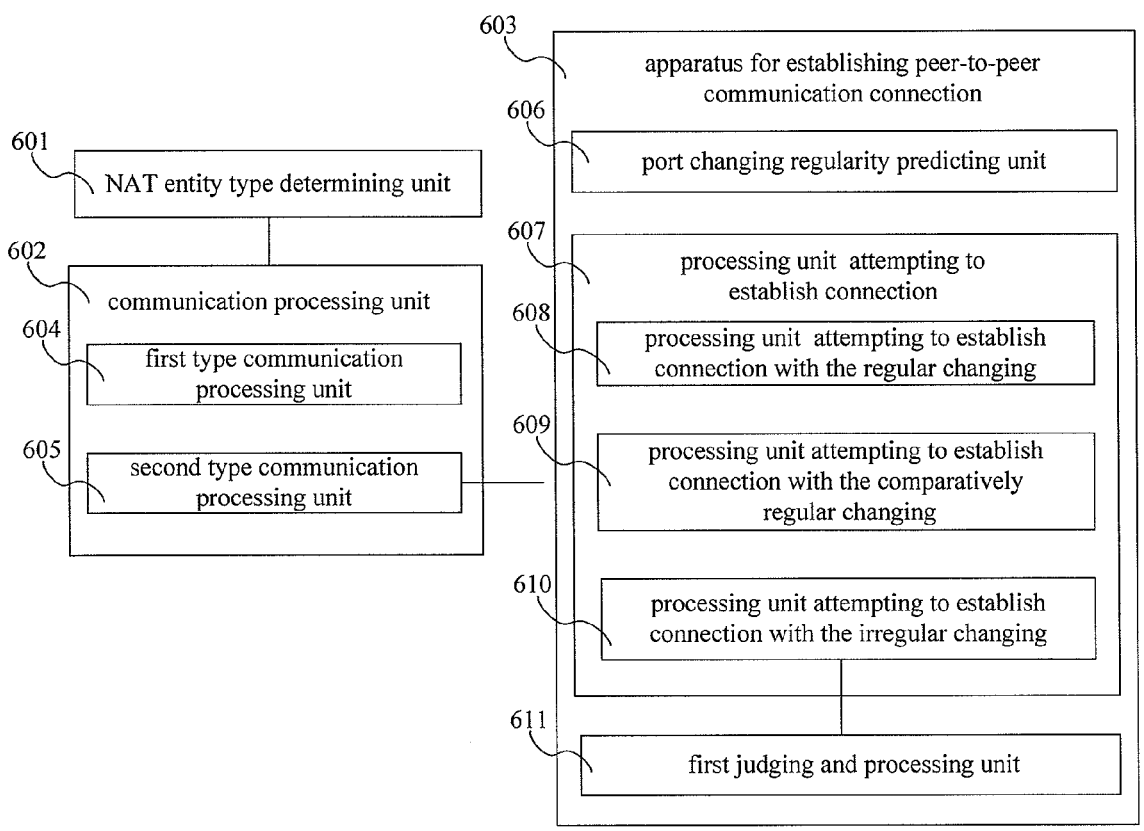
FIG. 6 is a schematic diagram for specifically realizing the structure of the apparatus and system of some embodiments.

FIG. 6 shows a structure of some system embodiments for traversing network address translation (NAT) to realize network communication. The system includes: an NAT entity type determining unit 601, a communication processing unit 602 and an apparatus for establishing peer-to-peer communication connection 603.

(1) The NAT entity type determining unit 601 is adapted to determine the type information of NAT entity needing to be traversed when the user terminal can not initiate the communication with the peer user terminal directly by the peer-to-peer communication manner because there exists an NAT entity needing to be traversed in the user terminal.

As mentioned above, the type of the NAT entity includes two types as follows.

The first type includes that the local user terminal is located in the public network and the peer user terminal is located under the NAT; or the local user terminal is located in the symmetric NAT and the peer user terminal is located under a completely Cone NAT or a Cone NAT with restricted IP; or the local user terminal is located under the completely Cone NAT or the Cone NAT with restricted IP and the peer user terminal is located in the symmetric NAT.

The second type includes that the local user terminal is located under the symmetric NAT and the peer user terminal is located under the symmetric NAT or the Cone NAT with restricted IP; or the local user terminal is located under the Cone NAT with restricted port and the peer user terminal is located under the symmetric NAT.

(2) The communication processing unit 602 is adapted to trigger a predefined passive peer-to-peer communication manner corresponding to the type information of the NAT entity according to the type information of the NAT entity determined by The NAT entity type determining unit 601. The passive peer-to-peer communication manner is requesting the peer user terminal to initiate to establish the peer-to-peer communication procedure. Alternatively, the communication processing unit 602 is adapted to trigger the realization apparatus for establishing the peer-to-peer communication connection to establish the communication connection with the peer user terminal. The user terminals communicate between each other;

In some other embodiments, in according with the types of the NAT entity, the communication processing unit 602 includes:

A first type communication processing unit 604 is adapted to trigger the passive peer-to-peer communication manner that the peer user terminal initiates to establish the peer-to-peer communication procedure to establish the peer-to-peer connection between the user terminals for the communication between the user terminals when the type of the NAT entity is the first type; or, A second type communication processing unit 605 is adapted to trigger the realization apparatus for establishing the peer-to-peer communication connection to establish the peer-to-peer connection for the communications between the user terminals when the type of the NAT entity is the second type.

(3) The apparatus for establishing the peer-to-peer communication connection 603 is adapted to establish the peer-to-peer communication connection between the local user terminal and the peer user terminal, specifically to establish the peer-to-peer communication connection by the manner of attempting. The apparatus specifically includes following units: A port changing regularity predicting unit 606 and a processing unit attempting to establish connection 607.

1. The port changing regularity predicting unit 606 is adapted to predict one port or ports which are possibly changed to next time according to the port changing regularity of the symmetric NAT of the peer user terminal;

The port changing regularity predicting unit 606 is adapted to order the peer user terminal under the symmetric NAT to continuously send data to a group of ports maintained by the server or a check server on the network side. The server predicts the corresponding port information according to the received data and determines the changing regularity of the symmetric NAT according to the port information.

The changing regularity may specifically include following three types:

1. a regular changing regularity which may accurately predict the next possible changing port;
2. a comparatively regular changing regularity which may predict the scope information of the next possible changing port;
3. an irregular changing regularity which may not predict the information of the next possible changing port.

2. The processing unit attempting to establish connection 607 is adapted to attempt to establish peer-to-peer communication connection with the peer user terminal through the predicted port or ports until the corresponding peer-to-peer communication connection is established.

In some embodiments, based on above three changing regularities, the processing unit attempting to establish connection 607 specifically includes:

A processing unit attempting to establish connection with the regular changing 608 is adapted to attempt to accurately establish peer-to-peer communication connection according to the predicted next changing port after determining that the port is regular changing;

A processing unit attempting to establish connection with the comparatively regular changing 609 is adapted to attempt to establish the peer-to-peer communication connection by adding a preset value to the current port value as a predicting scope of the port every time;

A processing unit attempting to establish connection with the irregular changing 610 is adapted to update the port for sending data by the symmetric NAT to the server, trigger the processing of ordering the peer user terminal located in the symmetric NAT to continuously send data and attempt to establish the peer-to-peer communication connection. And the processing unit attempting to establish connection with the irregular changing 610 may also communicate with the first judging and processing unit 611 which is adapted to judge whether the times of the port updating have achieved a preset value or not, if the times of the port updating have achieved the preset value, the communication between the two user terminals is established by the manner of the server transition, otherwise the processing unit attempting to establish connection with irregular changing 610 continues to execute the corresponding processing.

In accordance with the above-mentioned technological solutions, the peer-to-peer direct communication manner is adopted as much as possible instead of using the transition server in the communication procedure between clients. The occupation of the server resource in the communication procedure is reduced and the cost of network operation is further saved.

Finally, it should be understood that the above embodiments are used to explain, but not to limit the technological solution. In despite of describing the embodiments in detail, it should be understood that various modifications, changes or equivalent replacements could be made by an ordinary person skilled in the relevant field without departing from the spirit and scope of the technological solution, which should be covered in the extent of the claims.

What is claimed is:

1. A method for establishing a peer-to-peer connection between a local user terminal and a peer user terminal, comprising:

predicting one port or a group of ports to be used in a peer-to-peer communication connection, according to a port changing regularity of symmetric network address translation (NAT) of the peer user terminal;

attempting to establish a peer-to-peer communication connection with the peer user terminal, via the one port or the group of ports predicted until the corresponding peer-to-peer communication connection is established; and wherein, the processing of attempting to establish the peer-to-peer communication connection specifically comprises executing a hole punching for n rounds by the peer user terminal, wherein a circular hole punching from N to N+U is executed in the first round, and circular hole punching from N+U×(m−2) to N+U×m, or from N+U×(m−1) to N+U×m, is executed in the mth round until the connection is established, wherein N is a current port number, U is a preset value, and n and m are integers respectively greater than one.

2. The method according to claim 1, wherein the method further comprises determining the changing regularity of NAT of the peer user terminal, specifically comprising:

ordering, by a server, the peer user terminal under the symmetric NAT to continuously send data to one group of ports maintained by a server or to a check server;

predicting, by the server, a corresponding port information according to received data; and determining, by the server, the changing regularity of the symmetric NAT according to the port information.

3. The method according to claim 1, wherein the changing regularity comprises:

a regular changing regularity which may accurately predict the next possible changing port;

a comparatively regular changing regularity which may predict a scope information of the next possible changing port; and an irregular changing regularity which may not predict the information of the next possible changing port;

and, the processing of attempting to establish the peer-to-peer communication connection specifically comprises:

judging whether the changing regularity of the port of the symmetric NAT where the peer user terminal is located is the irregular changing regularity or not; if the changing regularity is the irregular changing regularity, updating the port of the symmetric NAT for sending data to the server and triggering a processing to order the peer user terminal located under the symmetric NAT to continuously send the data; otherwise, judging whether the changing regularity is the comparatively regular changing regularity or not; if the changing regularity is the comparatively regular changing regularity, adding a preset value for the current port value as a scope for predicting the port and attempting to establish the peer-to-peer communication connection; otherwise, predicting the port to be regular changing and attempting to accurately establish the peer-to-peer communication connection according to the predicted next changing port.

4. The method according to claim 3, wherein when the changing regularity of the port is the irregular changing regularity, the method further comprises:

judging whether the times of the port updating have reached a preset value or not; if the times have reached the preset value, establishing the communication between the two user terminals by the manner of server transition; otherwise, updating the port of the symmetric NAT for sending the data to the server and triggering the processing to order the peer user terminal located under the symmetric NAT to continuously send the data.

5. The method according to claim 3, wherein the processing of adding the preset value to the current port value as the scope for predicting the port and attempting to establish the peer-to-peer communication connection specifically comprises any one of the following manners:

executing circular hole punching from N to N+U by the peer user terminal until the connection between the two user terminals is established, wherein N is a current port number and U is a preset value;

or, executing a hole punching for n round by the peer user terminal and executing, by the peer user terminal, a circular hole punching from N to N+U×m in the mth round until the connection between the two user terminals is established, wherein n is an integer greater than one.

6. An apparatus for establishing peer-to-peer communication connection, adapted to establish a peer-to-peer communication connection between a local user terminal and a peer user terminal, comprising:

a port changing regularity predicting unit, adapted to predict a port or ports to be used in a peer-to-peer communications connection according to a port changing regularity of a symmetric NAT of the peer user terminal; and a processing unit attempting to establish connection, adapted to attempt to establish the peer-to-peer communication connection with the peer user terminal via a predicted port or ports until the corresponding peer-to-peer communication connection is established, wherein the processing unit specifically is adapted to execute a hole punching for n rounds, wherein a circular hole punching from N to N+U is executed in the first round, and circular hole punching from N−U×(m−2) to N+U×m, or from N+U×(m−1) to N+U×m, is executed in the mth round until the connection is established, wherein N is a current port number, U is a preset value, and n and m are integers respectively greater than one.

7. The apparatus according to claim 6, wherein the changing regularity comprises: a regular changing regularity which may accurately predict a next possible changing port, a comparatively regular changing regularity which may predict a scope information of next possible changing port, and an irregular changing regularity which may not predict the information of the next possible changing port; and, the processing unit attempting to establish connection comprising:

a processing unit attempting to establish connection with the regular changing, adapted to attempt to accurately establish peer-to-peer communication connection according to the predicted next changing port after determining that the port is regular changing;

a processing unit attempting to establish connection with the comparatively regular changing, adapted to attempt to establish peer-to-peer communication connection by adding a preset value to the current port value as a predicting scope of the port every time;

a processing unit attempting to establish connection with the irregular changing, adapted to update the port for sending data by the symmetric NAT to the server, trigger the processing of ordering the peer user terminal located in the symmetric NAT to continuously send data, and attempt to establish the peer-to-peer communication connection.

8. The apparatus according to claim 7, wherein the processing unit attempting to establish connection with the irregular changing further communicates with a first judging and processing unit; the first judging and processing unit is adapted to judge whether the times of port update have achieved a preset value or not; the communication between the two user terminals is established by a manner of server transition if the times of the port update have achieved the preset value; the processing unit attempting to establish connection with the irregular changing continues to execute the corresponding processing if the times of the port update have not achieved the preset value.

9. The apparatus according to claim 8, wherein the port changing regularity predicting unit is adapted to order the peer user terminal located under the symmetric NAT to continuously send data to a group of ports maintained by a server or a check server on a server side; the server predicts the corresponding port information according to the received data and determines the changing regularity of the symmetric NAT according to the port information.

10. The apparatus according to claim 7, wherein the port changing regularity predicting unit is adapted to order the peer user terminal located under the symmetric NAT to continuously send data to a group of ports maintained by a server or a check server on a server side; the server predicts the corresponding port information according to the received data and determines the changing regularity of the symmetric NAT according to the port information.

11. The apparatus according to claim 6, wherein the port changing regularity predicting unit is adapted to order the peer user terminal located under the symmetric NAT to continuously send data to a group of ports maintained by a server or a check server on a server side; the server predicts the corresponding port information according to the received data and determines the changing regularity of the symmetric NAT according to the port information.

* * * * *